US006811213B2

(12) United States Patent
Yamashita et al.

(10) Patent No.: US 6,811,213 B2
(45) Date of Patent: Nov. 2, 2004

(54) WEATHER STRIP FOR USE ON A SUNROOF

(75) Inventors: Takashi Yamashita, Hiroshima (JP);
Masayuki Daio, Hiroshima (JP);
Masaharu Ohnishi, Wako (JP);
Hirofumi Yamane, Wako (JP);
Tatsuaki Uehara, Tochigi-ken (JP);
Koichi Hotta, Tochigi-ken (JP)

(73) Assignees: Nishikawa Rubber Co., Ltd.,
Hiroshima-ken (JP); Honda Giken Kogyo Kabushiki Kaisha, Tokyo (JP);
Yachiyo Kogyo Kabushiki Kaisha,
Saitama-ken (JP)

( * ) Notice: Subject to any disclaimer, the term of this patent is extended or adjusted under 35 U.S.C. 154(b) by 0 days.

(21) Appl. No.: 10/358,683

(22) Filed: Feb. 5, 2003

(65) Prior Publication Data

US 2003/0178874 A1 Sep. 25, 2003

(30) Foreign Application Priority Data

Mar. 20, 2002 (JP) ......................................... 2002-078170

(51) Int. Cl.$^7$ ................................................ B60J 10/12
(52) U.S. Cl. ............................. 296/216.06; 296/216.09; 49/498.1
(58) Field of Search ....................... 296/216.06, 216.09; 49/498.1

(56) References Cited

U.S. PATENT DOCUMENTS 4,970,102 A * 11/1990 Guillon ....................... 428/122
5,538,317 A * 7/1996 Brocke et al. ........... 296/216.09

FOREIGN PATENT DOCUMENTS

| EP | 1260393 | * | 5/2002 | |
| JP | 2-3558 | * | 1/1990 | |
| JP | 03-284419 | | 12/1991 | |
| JP | 406073963 | * | 3/1994 | ................ 49/498.1 |
| JP | 06-144018 | | 5/1994 | |
| JP | 7-290972 | * | 11/1995 | |
| JP | 08-113040 | | 5/1996 | |
| JP | 8-113040 | * | 5/1996 | |
| JP | 11-321339 | * | 11/1999 | |
| JP | 2001-301470 | * | 10/2001 | |

* cited by examiner

Primary Examiner—Dennis H. Pedder
(74) Attorney, Agent, or Firm—Flynn, Thiel, Boutell & Tanis, P.C.

(57) ABSTRACT

There is provided a weather strip for use on a sunroof capable of preventing squeak noises being generated in advance between a hollow seal part and a roof panel during traveling of a car by allowing the hollow seal part to satisfactorily follow vibrations of the roof panel. The weather strip ensures sealing property between a roof glass mounted on the sunroof of a car and a roof panel and comprises a built-in base part attached to the roof glass, and a hollow seal part composed of continuous ends integrally formed with the built-in base part and having substantially a circular cross section, a tip end contact part elastically contacting the roof panel, wherein thicker parts protruding inward and being continuous with the built-in base part are formed on the continuous ends of the hollow seal part and protrusions protruding inward are formed on substantially middle parts between the continuous ends and the tip end contact part.

3 Claims, 2 Drawing Sheets

WEATHER STRIP FOR USE ON A SUNROOF

FIELD OF THE INVENTION

The invention relates to a weather strip for use on a sunroof of a car so as to ensure sealing property between a roof panel and a roof glass.

BACKGROUND OF THE INVENTION

A conventional weather strip for use on a sunroof is described now with reference FIGS. 1 and 2.

A weather strip 20 is provided on a sunroof of a car for ensuring sealing property between a roof panel 11 and a roof glass 12. The weather strip 20 generally comprises a built-in base part 21 attached to the roof glass 12 and a hollow seal part 22 integrally formed with the built-in base part 21, which elastically contacts the roof panel 11. The hollow seal part 22 has substantially a uniform thickness and is substantially semicircular in cross section, and it also has continuous ends 24 which are formed on both ends of the hollow seal part 22 and continuous with the built-in base part 21.

Accordingly, in a state where the weather strip 20 is attached to the sunroof, the hollow seal part 22 is elastically deformed and a tip end contact part 23 thereof is brought into intimate contact with the roof panel 11 to ensure sealing property between the weather strip 20 and the roof panel 11.

However, the conventional weather strip 20 for use on a sunroof has a problem that squeak noises are generated between the hollow seal part 22 and the roof panel 11 due to vibrations generated while driving a car.

The squeak noises are caused by the fact that the tip end contact part 23 of the hollow seal part 22 cannot follow the vibrations of the roof panel 11. That is, since the hollow seal part 22 has substantially a uniform thickness, while the tip end contact part 23 thereof elastically contacts the roof glass 12, sealing repulsion is concentrated to the continuous ends 24 of the hollow seal part 22.

As a result, middle parts between the continuous ends 24 and the tip end contact part 23 of the hollow seal part 22 (which are the parts elastically deformed most) are elastically deformed outward, and hence the amount of elastic deformation of the tip end contact part 23 of the hollow seal part 22 is reduced. Accordingly, a contact area 30 of the tip end contact part 23 relative to the roof panel 11 is made smaller, and hence sealing repulsion locally acts on the roof panel 11. As a result, when the roof panel 11 is vibrated, the tip end contact part 23 of the hollow seal part 22 slides on the roof panel 11 so that squeak noises are generated.

SUMMARY OF THE INVENTION

The invention has been developed to solve the foregoing problems and it is an object of the invention to provide a weather strip for use on a sunroof capable of preventing squeak noises from generating between a hollow seal part and a roof panel while driving a car by making the hollow seal part follow vibrations of the roof panel.

A weather strip 1 for use on a sunroof according to the invention for ensuring sealing property between a roof glass 12 mounted on the sunroof of a car and a roof panel 11 comprises a built-in base part 8 attached to the roof glass 12, and a hollow seal part 2 composed of continuous ends 4 integrally formed with the built-in base part 8 and having substantially a circular cross section. A tip end contact part 3 of the hollow seal part 2 elastically contacts the roof panel 11. Thicker parts 5 are formed on the continuous ends 4 of the hollow seal part 2 which protrudes inward and are continuous with the built-in base part 8. Protrusions 6 are formed on substantially the middle between the continuous ends 4 and the tip end contact part 3, protruding inward. The thickness 60 of the portion of the hollow seal part 2 between the protrusions 6 is made thinner and a curvature radius 50 thereof is made larger.

PREFERRED EMBODIMENT OF THE INVENTION

Figure 1:
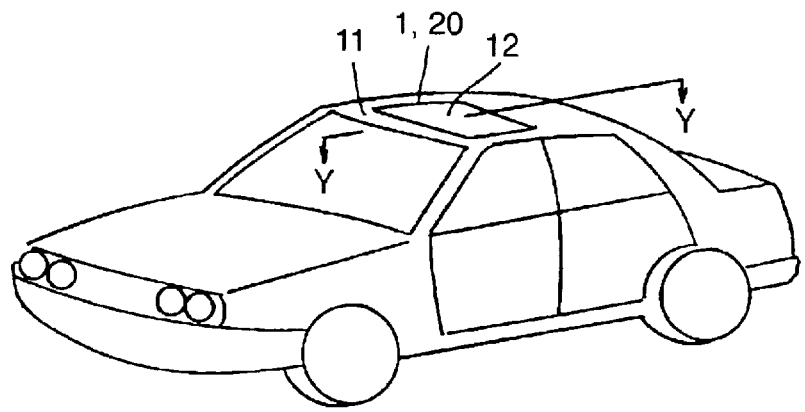
FIG. 1 is a perspective view of a car provided with a weather strip for use on a sunroof.
Figure 2:
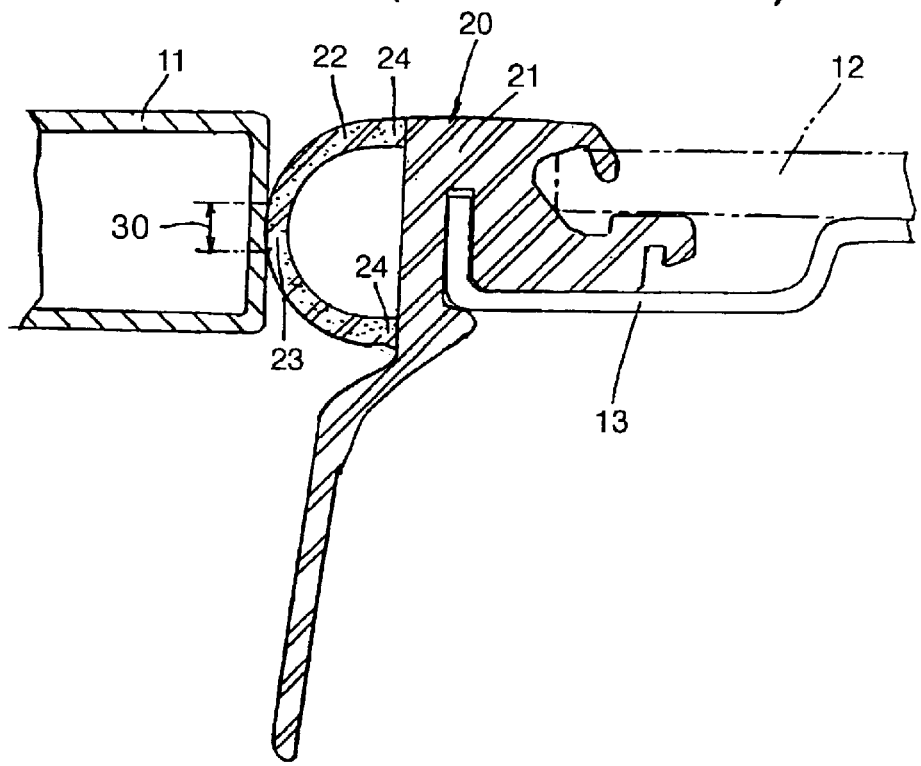
FIG. 2 is a sectional view of a conventional weather strip for use on a sunroof taken along line Y—Y in FIG. 1.
Figure 3:
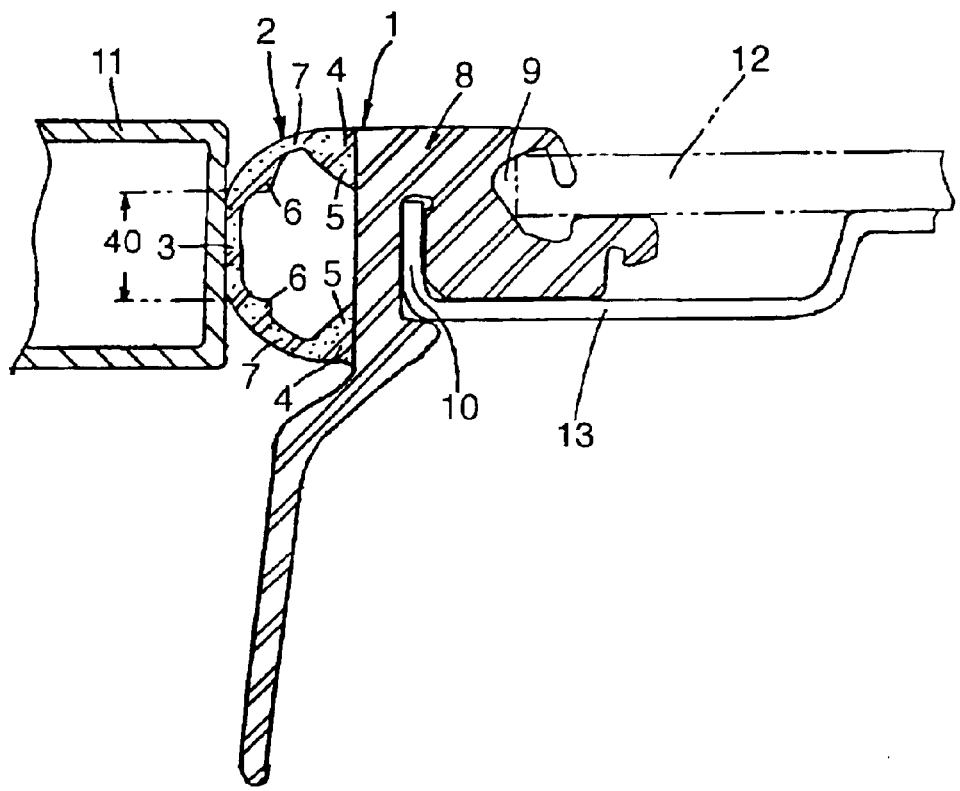
FIG. 3 is a sectional view of a weather strip for use on a sunroof of the invention taken along line Y—Y in FIG. 1.
Figure 4:
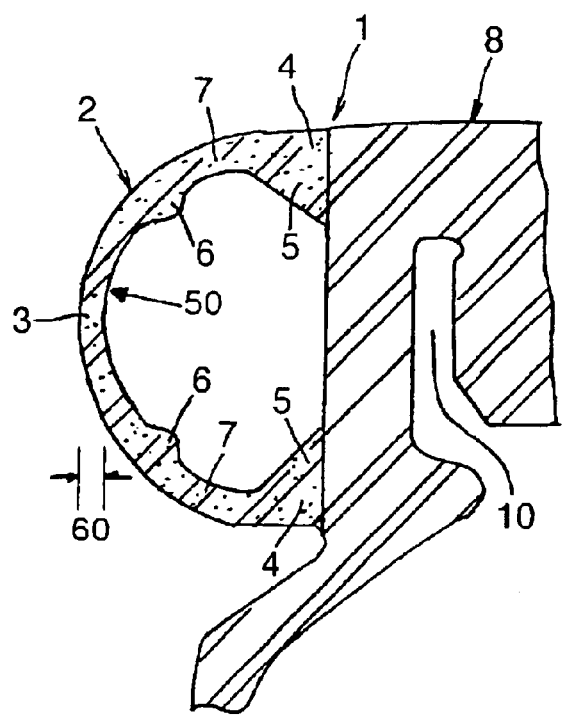
FIG. 4 is an enlarged sectional view of a main part of the weather strip for use on a sunroof of the invention.

A preferred embodiment of a weather strip 1 according to the invention is now described with reference to FIGS. 1, 3 and 4.

The weather strip 1 ensures sealing property between a roof glass 12 mounted on a sunroof of a car and a roof panel 11. It comprises a built-in base part 8 and a hollow seal part 2.

The built-in base part 8 is formed of solid rubber. The base part 8 has an engagement groove 10 at one end for an engagement with a seal holder 13, and an engagement recess 9 for an engagement with the roof glass 12.

The hollow seal part 2 is formed of sponge rubber and is substantially circular in cross section. The hollow seal part 2 has continuous ends 4 at both ends which are integrally formed with the built-in base part 8, and a tip end contact part 3 which elastically contacts the roof panel 11. Thicker parts 5 are formed on the continuous ends 4 of the hollow seal part 2, which protrude inward and are continuous with the built-in base part 8. Protrusions 6 are formed on substantially the middle between the continuous ends 4 and the tip end contact part 3, protruding inward. A thickness 60 of the tip end contact part 3 and a thickness of thinner parts 7 formed between the thicker parts 5 and the protrusions 6 are determined to be substantially the same.

In a state where the weather strip 1 is attached to the sunroof, the tip end contact part 3 of the hollow seal part 2 elastically contacts a peripheral end portion of the roof panel 11. Since the hollow seal part 2 has the thicker parts 5 and protrusions 6 in this state, sealing repulsion strongly acts on the tip end contact part 3 having the least rigidity. Accordingly, the tip end contact part 3 is largely elastically deformed, and contacts the roof panel 11 at a large area.

Further, the thinner parts 7 are also moderately deformed by this sealing repulsion so as to properly maintain the amount of elastic deformation of the tip end contact part 3. That is, when there occur variations in built-in dimensions and sealing repulsion is smaller than predetermined repulsion, the thinner parts 7 are slightly elastically deformed. And, when sealing repulsion is larger than predetermined repulsion, the thinner parts 7 are largely elastically deformed. Therefore, in both cases, the thinner parts 7 act to maintain the amount of deformation of the tip end contact part 3 constant.

Accordingly, the tip end contact part 3 of the hollow seal part 2 can always contact the peripheral end portion of the roof panel 11 with a uniform force at a large contact area 40. Also, the thinner parts 7 are deformed when the roof panel 11 vibrates while driving a car so that the tip end contact part 3 of the hollow seal part 2 is prevented from sliding on the roof panel 11. Accordingly, the generation of squeak noises can be prevented successfully.

With the weather strip 1 of the preferred embodiment, a thickness 60 of the hollow seal part 2 between the protrusions 6, 6 is made thinner and a curvature radius 50 of the hollow seal part 2 is set to be larger than that of the conventional weather strip 20. Also, a contact surface 40 of the hollow seal part 2 relative to the roof panel 11 is made larger. As a result, generation of squeak noises is successfully prevented.

Meanwhile, slip agent such as silicon and so forth is coated on the tip end contact part 3, the generation of squeak noises can be more successfully prevented even if the tip end contact part 3 cannot follow the vibrations of the roof panel 11 in case the roof panel 11 vibrates heavily.

Since the weather strip 1 for use on a sunroof of the invention is provided with the thicker part 5 and the protrusions 6 on the hollow seal part 2, the tip end contact part 3 can be always brought into uniformly contact with the peripheral end portion of the roof panel 11 at a large area. As a result, when the roof panel 11 vibrates while driving a car, the thinner parts 7 are deformed so that the tip end contact part 3 of the hollow seal part 2 can be prevented from sliding on the roof panel 11, thereby successfully preventing generation of squeak noises.

The disclosure of Japanese Patent Application No. 2002-78170 filed Mar. 20, 2002 including specification, claims, and drawings, is incorporated herein by reference.

What is claimed is:

1. A weather strip for use on a sunroof for ensuring a seal between a roof glass mounted on the sunroof and a roof panel comprising:

a base part having an opening on a first end for receiving the roof glass and a base portion on a second end directed toward the roof panel;

a hollow seal part secured to the base portion on the second end of the base part, the improvement of said hollow seal part comprising:

a base section secured to the base portion of the base part and having a thickness;

a thinned section formed adjacent said base section, said thinned section having a thickness less than the thickness of said base section;

a protrusion section adjacent said thinned section and defining an inwardly projecting protrusion, said protrusion section having a thickness greater than the thickness of said thinned section;

a seal end section adjacent said protrusion section for elastically contacting a roof panel, said seal end section having a thickness less than the thickness of said protrusion section; and a closed hollow region within said hollow seal part and bordered on one side by said base part, said closed hollow region receiving said inwardly projecting protrusion, wherein when said hollow seal part contacts the roof panel, said seal end section elastically deforms to provide contact between a contact surface of the roof panel and a contact surface of the seal end section to define a contact area, and said thinned section elastically deforms to maintain the contact area of the hollow seal part and the roof panel substantially constant, the deformation of said thinned section preventing vibration of the surface of the seal end section relative to a surface of the roof panel from generating squeak noises.

2. The weather strip according to claim 1, wherein a radius of an inner surface of said seal end section defines a radius of curvature.

3. The weather strip according to claim 1, wherein said protrusion section extends about the entirety of said seal end section and said thinned section extends about the entirety of said protrusion section.

* * * * *